UNITED STATES PATENT OFFICE.

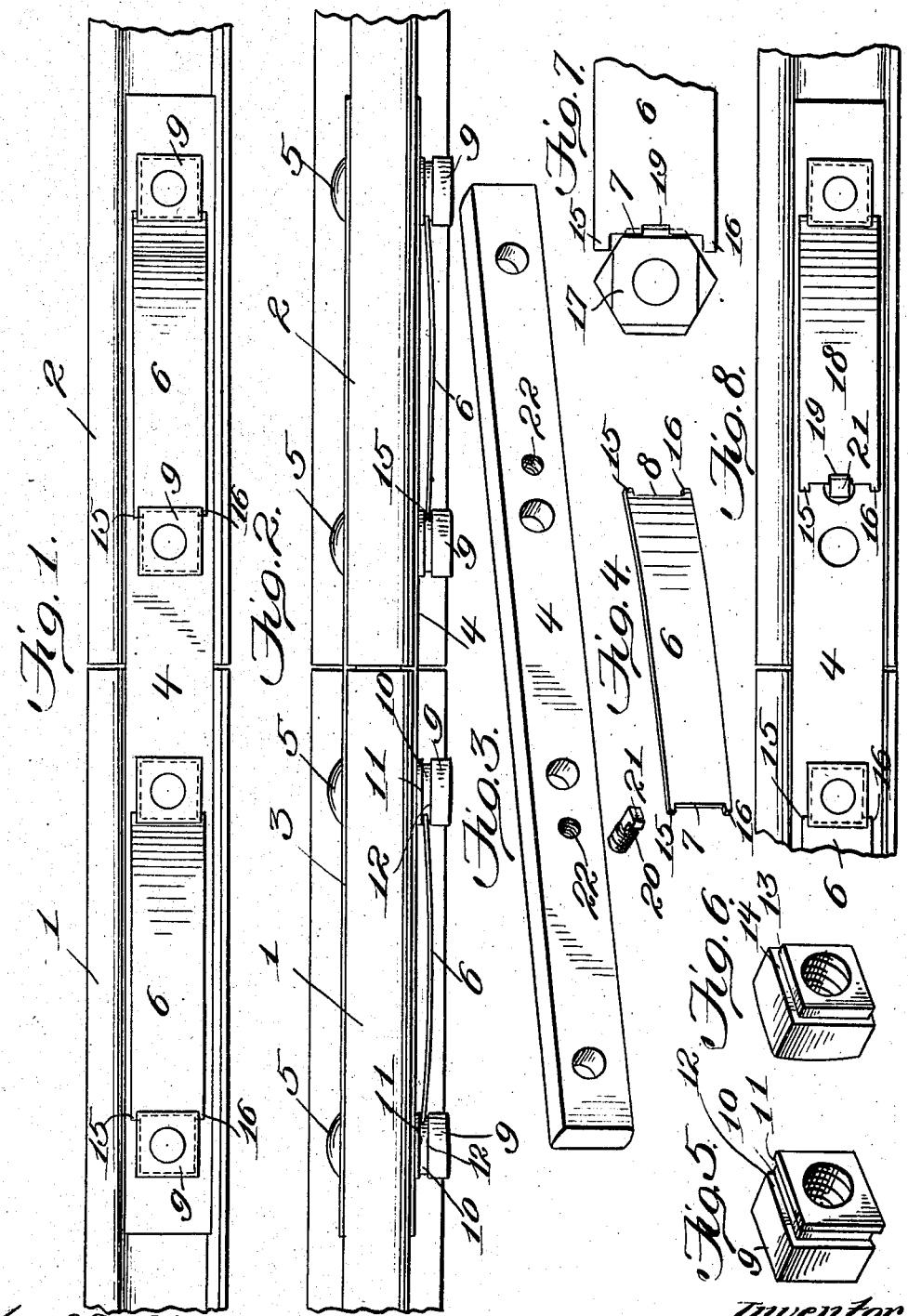

BENJAMINE E. NORRIS, OF NEAR BELLS, TENNESSEE.

NUT OR BOLT LOCK.

No. 894,691.　　　Specification of Letters Patent.　　　Patented July 28, 1908.

Application filed October 5, 1907. Serial No. 396,072.

*To all whom it may concern:*

Be it known that I, BENJAMINE E. NORRIS, a citizen of the United States, residing in the county of Haywood, near Bells, in the county of Crockett and State of Tennessee, have invented new and useful Improvements in Nut or Bolt Locks, of which the following is a specification.

My present invention relates to improvements in nut or bolt locks, and it has for its object primarily to provide an improved device of this character that is capable of being readily applied to the nut or nuts to be locked and which in practice serves to effectually prevent loosening thereof by reason of vibration and other causes, the locking device coöperating with the nut or nuts in a manner that will prevent relative displacement of the parts.

Another object of the invention is to provide a device of this character wherein a single part serves to simultaneously lock a plurality of nuts, thus adapting the device for use generally, and especially in connection with the bolts which secure rail joints.

Further objects of the invention are to provide a nut lock that is simple in construction and is capable of being manufactured cheaply, and also to provide a stop which serves as a substitute for one of the nuts in order that the locks may be used on rail joints wherein one or more of the bolts are omitted.

To these and other ends, the invention consists in certain improvements, and combinations and arrangements of parts, all as will be hereinafter more fully described, the novel features being pointed out particularly in the claims at the end of the specification.

In the drawing—Figure 1 is a side elevation of a rail joint provided with a pair of locking devices constructed in accordance with the present invention; Fig. 2 is a top plan view of the rail joint and the locking devices shown in Fig. 1; Fig. 3 is a perspective view of one of the fish plates and the stop which may be employed to coöperate with the locking device in cases where one of the bolts is omitted; Fig. 4 is a perspective view of the locking member; Figs. 5 and 6 are perspective views of nuts provided with circumferential grooves to coöperate with the locking member to retain it in locking position; Fig. 7 is a detail view showing the manner of applying the locking member to a hexagonal nut; Fig. 8 is a side elevation of a portion of the rail joint showing the manner of applying the locking member in cases where one of the bolts is omitted.

Similar parts are designated by the same reference characters in the several views.

I have shown the invention in the present instance as applied to a rail joint for the purpose of preventing loosening of the nuts by reason of vibration incident to the traffic over the rails, but it will be understood, however, that the invention is not limited in its use to rail joints and that it may be employed generally in all cases wherein it is desirable to lock a nut or a plurality of nuts in fastened position.

In the present embodiment of the invention the rail ends 1 and 2 are provided with the usual fish plates 3 and 4, a set of four bolts lettered 5, being shown in that form of the invention shown in Figs. 1 and 2, the bolts being spaced in a direction longitudinally of the rails as is usual. The lock in the present instance embodies primarily a locking member or key 6 which is composed of a strip of resilient material punched from a flat sheet of spring steel or other suitable metal, the resilient action of the strip having a normal or inherent tendency to return the same to a substantially straight form after being bowed or flexed. This locking member is adapted to extend between the nuts of two adjacent bolts, the opposite ends of the member being provided with the nut engaging surfaces 7 and 8 which engage flat sides formed on the sides of the respective nuts, the member being applied between them while it is flexed on a transverse axis so as to temporarily shorten its length, and when in position, the resilient action of the member tending to straighten it produces a spreading or separating tendency of its ends, and this action serves to retain the member in position.

In order to prevent disengagement of the member in a direction longitudinally of the bolts, it is preferable to provide the nuts with circumferential grooves which are formed either on one side of the nut, or they may extend entirely around it as shown in the present forms of the invention. The nuts 9 shown in Figs. 2 and 5 are each provided with a circumferential groove 10 which is arranged intermediate the inner and outer ends of the nut and forms a pair of inner and outer shoulders 11 and 12, respectively, the latter being arranged to engage the opposite flat sides of the locking member and thereby prevent its lateral displacement. However, the nuts may be formed as shown in Fig. 6, in which case the groove 13 is arranged immediately adjacent to the inner end of the nut and forms an outer shoulder 14 which serves to prevent displacement of the locking member in a direction toward the outer end of the nut, inward movement of the locking member being prevented by its engagement with the fish plate or a washer which may be interposed between the nut and the fish plate.

In order to prevent relative vertical displacement of the locking member, the opposite ends of the latter are preferably provided with pairs of retaining projections 15 and 16 which are adapted to extend over the upper and lower sides of the respective nuts, while the surfaces 7 and 8 abut against the proximate sides of the two adjacent nuts, and these projections are also held in coöperative relation with the nuts by reason of the resilient action of the locking member. In those forms of the invention shown in Figs. 1, 2, 5 and 6, the retaining projections will enter the grooves at the upper and lower sides of the respective nuts and will coöperate with the shoulders at those sides, and thereby assist also in preventing relative lateral displacement of the locking member.

In those cases wherein it is desirable to employ the locking device in connection with nuts of hexagonal or similar forms, the nut is provided with an angularly shaped reduced portion 17 at its inner end, as shown in Fig. 7, the surface 7 of the locking member in those cases engaging the flat sides of the reduced portion, and the retaining projections 15 and 16 engaging above and below the latter, those portions of the nut projecting beyond the reduced portion serving to confine the locking member and thereby prevent lateral displacement thereof. Or in other words, the angular reduced portion provides a groove or a series of grooves at the inner end of the nut, and those portions of the nut projecting beyond the reduced portion constitute shoulders as in the previous cases.

In some instances, the full set of bolts is not employed on each joint, that is to say, one or more of the bolts is omitted, and in those cases a locking member 18 is employed which is similar to those hereinbefore described, having one end formed to engage the remaining nut of the pair, and its opposite end is provided with a notch 19 which is adapted to coöperate with a similar notch 20 extending transversely of a stop 21 which is arranged in fixed relation to the fish plate or other stationary part to which the bolts are applied. This stop may be formed either of a finger struck up from the fish plates, or of a pin or screw applied thereto, a screw being shown in the present instance which is tapped into an opening 22 formed in the fish plate adjacent to the aperture for the bolt which has been omitted. In that case the transverse notch 20 of the stop serves to prevent relative lateral displacement of the locking member, and the notch 19 in the coöperating end of the latter serves to prevent a relative vertical movement thereof, the stop serving to sustain the locking member under tension so that its opposite end will remain in locking engagement with the nut which is to be locked.

In practice, the bolts may be applied in the usual way, but in tightening the same, they are turned preferably to positions where the flat sides of the two adjacent nuts are in substantially parallel relation. The locking member may then be applied by first flexing it longitudinally so that it assumes a bowed form that will permit the ends 7 and 8 thereof to enter the peripheral grooves of the nuts and the retaining projections to project at the upper and lower sides thereof, and when the pressure is released from the member its resilient action will tend to straighten it, causing the ends 7 and 8 to spread or extend and firmly engage the flat sides of the nuts. When the locking member is so applied, turning of the nuts is prevented, and displacement of the locking member cannot occur for the reason that the shoulder or shoulders in the periphery of the nuts serve to prevent relative lateral movement of the member, and the vertical movement thereof is prevented by the retaining projections which engage above and below the nut. The locking member may be readily removed for the purpose of further tightening of the bolts or removal thereof by flexing it into a bowed form, and this will disengage the retaining projections and the ends of the locking member from the nuts and thus permit its removal. Any suitable implement may be employed, of course, for bending or flexing the member in applying and removing it.

I have shown and described the invention in the present instance as applied to the nut portion of a bolt, but the purpose of the invention, of course, is to prevent relative rotation of the bolt or nut, and it will be understood that using the lock in connection with bolts provided with heads having angular surfaces, I contemplate applying the locking member to the bolt head in a manner similar to that in which it is applied to the nut, and in each instance wherein the term "nut" is employed, a bolt head is regarded as an equivalent, and for this reason, I shall employ the term polygonal portion to describe the part to be locked and which is therefore engaged by the locking member or plate.

A nut lock constructed in accordance with the present invention may be used advantageously, not only in connection with rail joints, but in various instances wherein it is desirable to prevent loosening of the nuts, as it does not mutilate the threads of the nut or bolt, and it is capable of being applied and removed with the greatest facility. Moreover, the locking member may be composed of a punching of spring steel, or other resilient metal, and it is capable of being applied to nuts of ordinary form, although it is preferable to employ nuts provided with peripheral grooves, shoulders or equivalent means which serve to prevent relative lateral displacement of the member by reason of vibration to which the parts are usually subjected.

I claim as my invention—

1. A lock of the character described comprising a normally straight resilient locking plate flexible laterally and capable of inherently assuming a straight form, said plate having at one end a pair of short upper and lower retaining projections forming continuations of the longitudinal edges of the plate and lying in the plane thereof, a transverse end bearing surface being formed on the plate between said retaining projections, a part to be locked having a polygonal portion which is provided with a pair of retaining shoulders spaced axially and forming an angular reduced portion between them, the transverse end bearing surface of the locking plate engaging the polygonal portion between the pair of axially spaced shoulders thereon, and means abutting against the opposite end of said plate, the inherent tendency of the plate causing it to assume an approximately straight form and producing a yielding pressure of said end surface against the said angular portion between said shoulders, the upper and lower projections on the locking plate serving to prevent edgewise displacement thereof in either direction.

2. A lock of the character described comprising a normally straight resilient locking plate flexible laterally and having an inherent tendency and ability to straighten, the plate being provided with an end surface lying in a plane at a right angle to the length of the plate, laterally spaced retaining projections extending beyond the said end surface and at right angles thereto, a part to be locked provided with a polygonal portion having a pair of parallel axially spaced shoulders both offset axially of the inner end of the projection and coöperating with the end surface and the retaining projections on the locking plate to prevent lateral displacement of the plate in either direction axially of the part, and means abutting against the opposite end of said plate, the inherent resilient action of the plate retaining the latter in engagement under yielding pressure with that portion of the projection between said shoulders.

3. A lock of the character described embodying a resilient locking member having one end adapted to engage a nut and provided at its opposite end with a transverse nut engaging surface having a depressed notch, and a stop adapted to be placed in fixed relation to the nut and provided with a transverse groove to coöperate with the edge of the notch of the locking member to retain the latter in flexed form.

4. A lock of the character described embodying a locking member composed of a flat strip of resilient material flexible laterally and having one end formed to engage a flat side of a nut, and its opposite end provided with a notch between its longitudinal edges, and a screw adapted to be secured in fixed relation to the nut and adapted to enter the notch of the locking member, the screw being provided with a transverse groove to receive the edge of the strip adjacent to the notch therein.

In testimony whereof I have hereunto set my hand in presence of two subscribing witnesses.

BENJAMINE E. NORRIS.

Witnesses:
   J. W. E. MOORE,
   CHAS. W. ANDERSON, Jr.